(12) United States Patent
Celik

(10) Patent No.: US 11,801,651 B2
(45) Date of Patent: Oct. 31, 2023

(54) SYSTEM FOR MANUFACTURING A SUPPORT STRUCTURE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 226 days.

(21) Appl. No.: 17/342,833

(22) Filed: Jun. 9, 2021

(65) Prior Publication Data

US 2022/0396044 A1 Dec. 15, 2022

(51) Int. Cl.
| | |
|---|---|
| B29D 30/02 | (2006.01) |
| B29D 30/00 | (2006.01) |
| B60C 7/18 | (2006.01) |
| B60C 7/24 | (2006.01) |
| B29L 30/00 | (2006.01) |

(52) U.S. Cl.
CPC ......... B29D 30/02 (2013.01); B29D 30/0005 (2013.01); B60C 7/18 (2013.01); B60C 7/24 (2013.01); *B29D 2030/0038* (2013.01); *B29L 2030/006* (2013.01)

(58) Field of Classification Search
CPC ................................................ B29L 2030/006
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson et al. |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst et al. |
| 4,226,273 A | 10/1980 | Long et al. |
| 4,235,270 A | 11/1980 | Kahaner et al. |
| 4,602,823 A | 7/1986 | Berg |
| 5,343,916 A | 9/1994 | Duddey et al. |

(Continued)

OTHER PUBLICATIONS

U.S. Appl. No. 17/111,741, filed Dec. 4, 2020.

(Continued)

*Primary Examiner* — Galen H Hauth
*Assistant Examiner* — Alexander D Booth
(74) *Attorney, Agent, or Firm* — June E. Rickey; Robert N. Lipcsik

(57) ABSTRACT

A system in accordance with the present invention cures and manufactures a partially-cured tire assembly. The system includes: a functional wheel member being slid into a corresponding annular, radially inner surface of the partially-cured tire assembly; a plurality of elongate spacer members; a first annular curing platen for axially securing the wheel member and spacer members relative to each other; a second annular curing platen for axially securing the wheel member and spacer members relative to each other; and a plurality of elongate inserts for creating a substantially smooth, uniform outer cylindrical surface formed by a radially outer surface of each insert and flap members of the tire assembly positioned by the radially outermost surfaces of the spacer members.

10 Claims, 21 Drawing Sheets

(56) References Cited

U.S. PATENT DOCUMENTS

| | | | |
|---|---|---|---|
| 5,800,643 | A | 9/1998 | Frankowski |
| 6,260,598 | B1 | 7/2001 | Tanaka |
| 8,962,120 | B2 | 2/2015 | Delfino et al. |
| 10,406,852 | B2 | 9/2019 | Celik et al. |
| 10,457,094 | B2 | 10/2019 | Celik et al. |
| 10,569,601 | B2 | 2/2020 | Reinhardt |
| 10,603,956 | B2 | 3/2020 | Celik et al. |
| 2004/0069385 | A1 | 4/2004 | Timoney et al. |
| 2010/0193097 | A1 | 8/2010 | McNier et al. |
| 2012/0205017 | A1 | 8/2012 | Endicott |
| 2015/0034225 | A1 | 2/2015 | Martin |
| 2018/0133992 | A1* | 5/2018 | Celik ................. B29D 30/0005 |
| 2019/0152256 | A1 | 5/2019 | Hwang et al. |
| 2019/0299709 | A1 | 10/2019 | Celik et al. |
| 2020/0047555 | A1 | 2/2020 | Costlow et al. |
| 2021/0061010 | A1 | 3/2021 | Van Riper et al. |
| 2022/0168980 | A1 | 6/2022 | Celik et al. |

OTHER PUBLICATIONS

U.S. Appl. No. 17/109,901, filed Dec. 2, 2020.
European search report for Serial No. EP22177667 dated Dec. 7, 2022.

\* cited by examiner

SYSTEM FOR MANUFACTURING A SUPPORT STRUCTURE

FIELD OF INVENTION

The present invention relates to wheel/tire assemblies, and more particularly, to a system for manufacturing non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires is limited. It is an object of the present invention to overcome this limitation and increase the load carrying capacity and durability of these spokes and hence the performance of the top loader non-pneumatic tire while also reducing manufacturing flexibility.

DEFINITIONS

As used herein and in the claims:

"Annular" means formed like a ring.

"Axial" and "axially" refer to lines or directions that are parallel to the axis of rotation of the tire.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Equatorial plane (EP)" means the plane perpendicular to the tire's axis of rotation and passing through the center of its tread; or the plane containing the circumferential centerline of the tread.

"Inner" means toward the inside of the tire and "outer" means toward its exterior.

"Lateral" means an axial direction.

"Normal load" means the load assigned by the appropriate standards organization for the service condition for the tire.

"Radial" and "radially" mean directions radially toward or away from the axis of rotation of the tire.

"Spring rate" means the stiffness of tire expressed as the slope of the load deflection curve at a given pressure.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Vertical deflection" means the amount that a tire deflects under load.

"Wheel" or "hub" means a structure for supporting the tire and mounting to the vehicle axle.

SUMMARY OF THE INVENTION

A system in accordance with the present invention cures and manufactures a partially-cured tire assembly. The system includes: a functional wheel member for rotating attachment to a vehicle, the wheel member being slid into a corresponding annular, radially inner surface of the partially-cured tire assembly; a plurality of elongate spacer members for maintaining corresponding uniform cavity dimensions in the partially-cured tire assembly tire assembly by fastening the spacer members to the hub member with flap members of the partially-cured tire assembly thereby enclosing a radially outermost surface of each of the spacer members; a first annular curing platen for axially securing the wheel member and spacer members relative to each other; a second annular curing platen for axially securing the wheel member and spacer members relative to each other; and a plurality of elongate inserts for creating a substantially smooth, uniform outer cylindrical surface formed by a radially outer surface of each insert and flap members of the tire assembly positioned by the radially outermost surfaces of the spacer members.

According to another aspect of the system, the wheel member has roughened up concave surfaces for increasing surface area and bond strength at an interface between the partially-cured tire assembly and the wheel member.

According to still another aspect of the system, the concave surfaces of the wheel member define raised tips for more efficient torque and force transfer between corresponding convex surfaces of the partially-cured tire assembly and the wheel member.

According to yet another aspect of the system, use of the functional wheel member from the beginning of the overall system reduces overall complexity and eliminates a later step of assembling the wheel member and tire assembly before attachment to the vehicle.

According to still another aspect of the system, the elongate inserts have a triangular cross-section.

According to yet another aspect of the system, the mold members are radially removable from around the complete, cured tire assembly.

According to still another aspect of the system, the curing platens are axially removable from the wheel member, the elongate spacer members, and elongate inserts.

According to yet another aspect of the system, the curing platens are heated by a hot liquid.

According to still another aspect of the system, the elongate spacer members platens are heated by steam.

According to yet another aspect of the system, the elongate inserts are heated by electricity.

A method in accordance with the present invention completes the curing of a partially cured tire assembly. The method includes the steps of: sliding a functional wheel member into a corresponding annular, radially inner surface of the partially-cured tire assembly; maintaining a plurality of spacer members within corresponding uniform cavities in the partially-cured tire assembly; fastening the spacer members to the wheel member with uncured flap members of the partially-cured tire assembly enclosing a radially outermost surface of each of the spacer members; axially securing first and second curing platens, the wheel member, and spacer members relative to each other; and creating a substantially smooth, uniform outer cylindrical surface formed by a radially outer surface of each spacer member and each of the uncured flap members of the partially-cured tire assembly positioned by the radially outermost surfaces of the spacer members.

According to another aspect of the method, a further step includes serially placing an uncured inner annular shear band and an uncured outer annular tread member of the partially-cured tire assembly circumferentially around the uniform outer cylindrical surface.

According to still another aspect of the method, a further step includes affixing the uncured inner annular shear band and the uncured outer annular tread member of the partially-cured tire assembly to each other.

According to yet another aspect of the method, a further step includes placing a plurality of mold members circumferentially around a radially outer surface of the tread member.

According to still another aspect of the method, a further step includes forming a tread shaped outer surface in the outer surface of the tread member by radially inner surfaces of the mold members.

According to yet another aspect of the method, a further step includes heating the spacer members, curing platens, elongate inserts, and mold members in order to form the flap members, shear band, and tread member into a fully-cured tire assembly.

According to still another aspect of the method, a further step includes radially removing the mold members from around the fully-cured tire assembly.

According to yet another aspect of the method, a further step includes axially removing the curing platens from the wheel member.

According to still another aspect of the method, a further step includes axially withdrawing the spacer members and inserts from the fully-cured tire assembly to reveal stable cavities within a spoke structure of a fully-cured tire assembly.

According to yet another aspect of the method, the heating step includes a medium from the group consisting of a hot liquid, steam, and electricity.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 22:
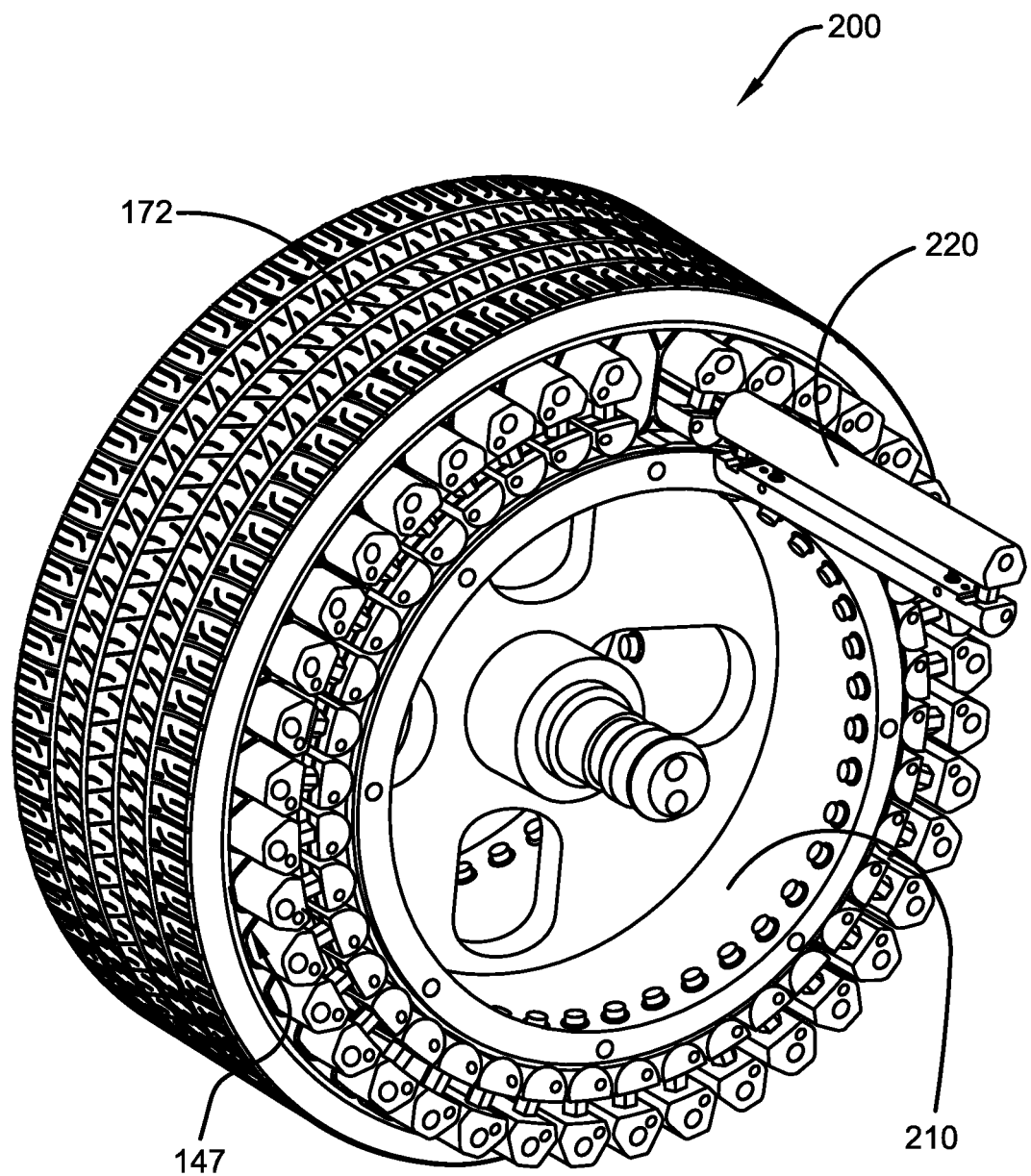
FIG. 22 is a schematic perspective view of yet another part of the assembly of FIG. 3.
Figure 23:
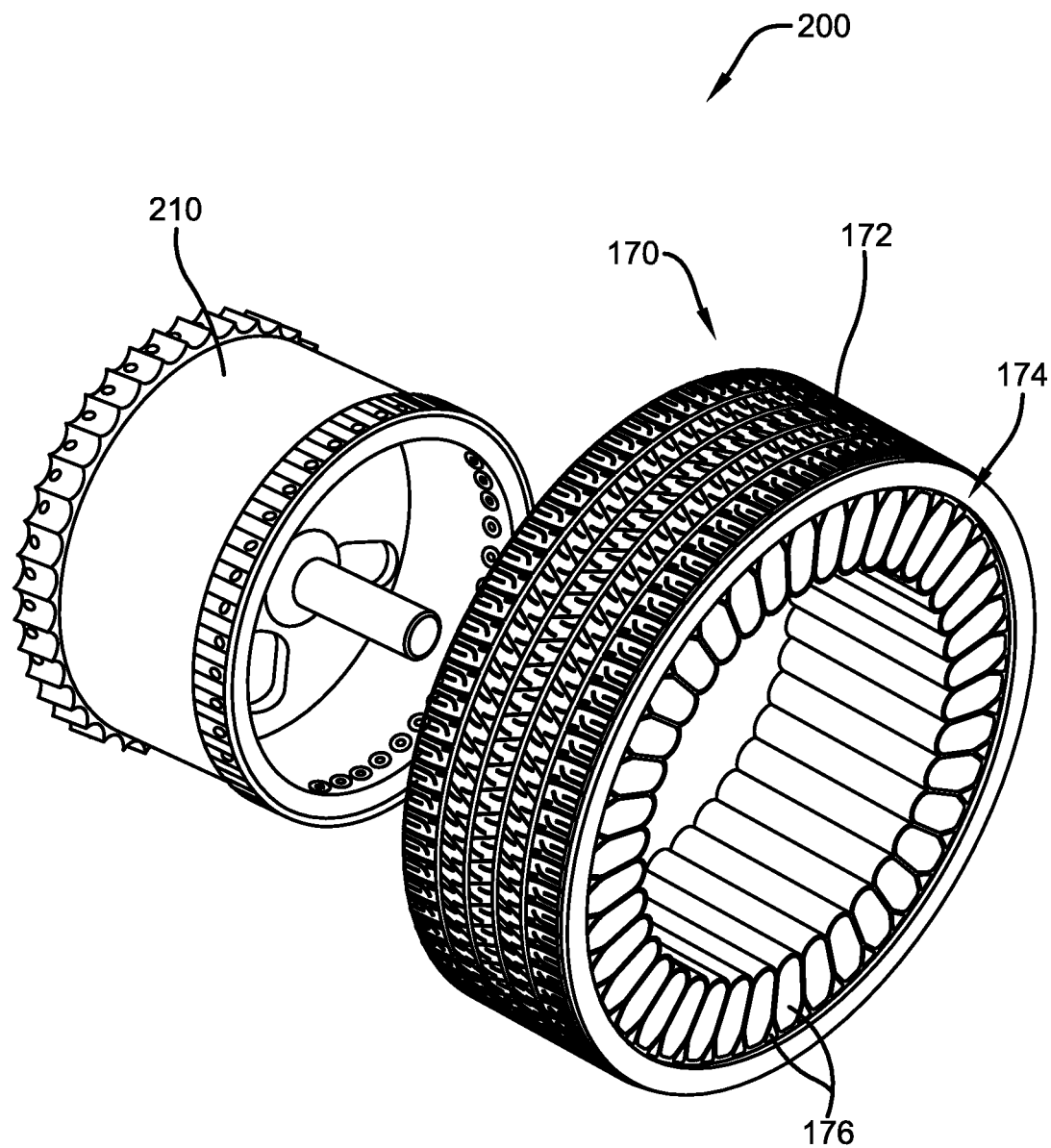
FIG. 23 is a schematic perspective view of still another part of the assembly of FIG. 3.

As shown in FIGS. 22-23, an example tire assembly for use with the present invention, such as that described in Applicant's U.S. patent application Ser. Nos. 17/109,901 and 17/111,741, both incorporated herein by reference in their entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel (not shown), and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale tire assemblies. The inner central rim may include steel, cast iron, aluminum, aluminum alloys, magnesium allows, and/or iron alloys.

FIGS. 2-23 show a system 200 for use with the present invention that may cure and manufacture partially-cured pneumatic and/or non-pneumatic tire assemblies 140. The system 200 may include an annular hub member 210 slid into a corresponding annular, radially inner surface 142 of the tire assembly 140, a plurality of spacer members 220 for maintaining corresponding uniform cavity dimensions in the tire assembly 140 by fastening the spacer members 220 to the hub member 210 with flap members 147 of the tire assembly 140 enclosing a radially outermost surface 222 of each of the spacer members 220, first and second curing platens 230, 240 for axially securing the hub member 210 and spacer members 220 relative to each other, and a plurality of triangular inserts 250 for creating a substantially smooth, uniform outer cylindrical surface formed by a radially outer surface 252 of each triangular insert 250 and each of the flap members 147 of the tire assembly 140 positioned by the radially outermost surfaces 222 of the spacer members 220. The curing platens 230, 240 may also have spring hook members 270 for maintaining alignment with the spacer members 220 and the remaining parts of the assembly 200.

Figure 17:
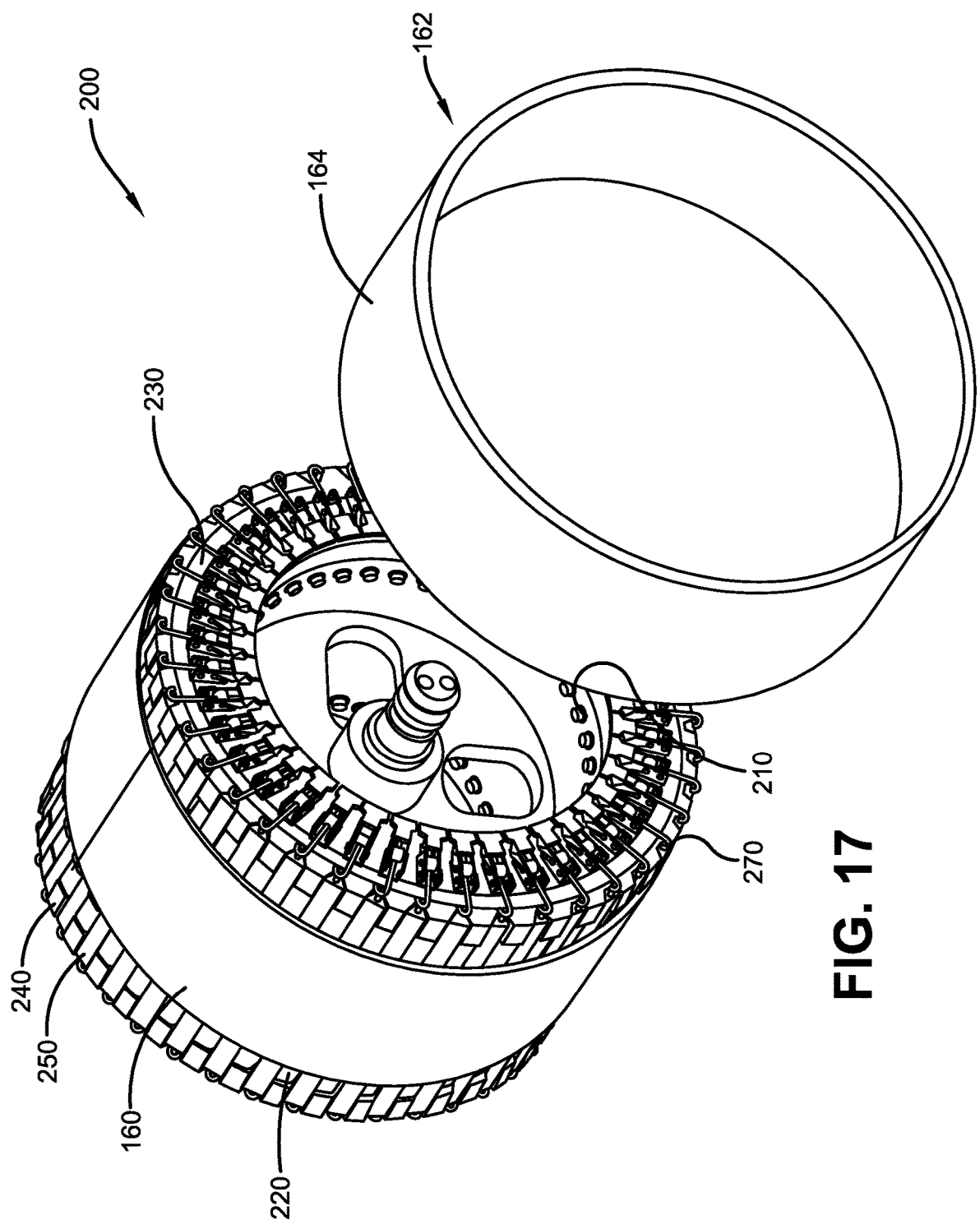
FIG. 17 is a schematic perspective view of still another part of the assembly of FIG. 3.
Figure 18:
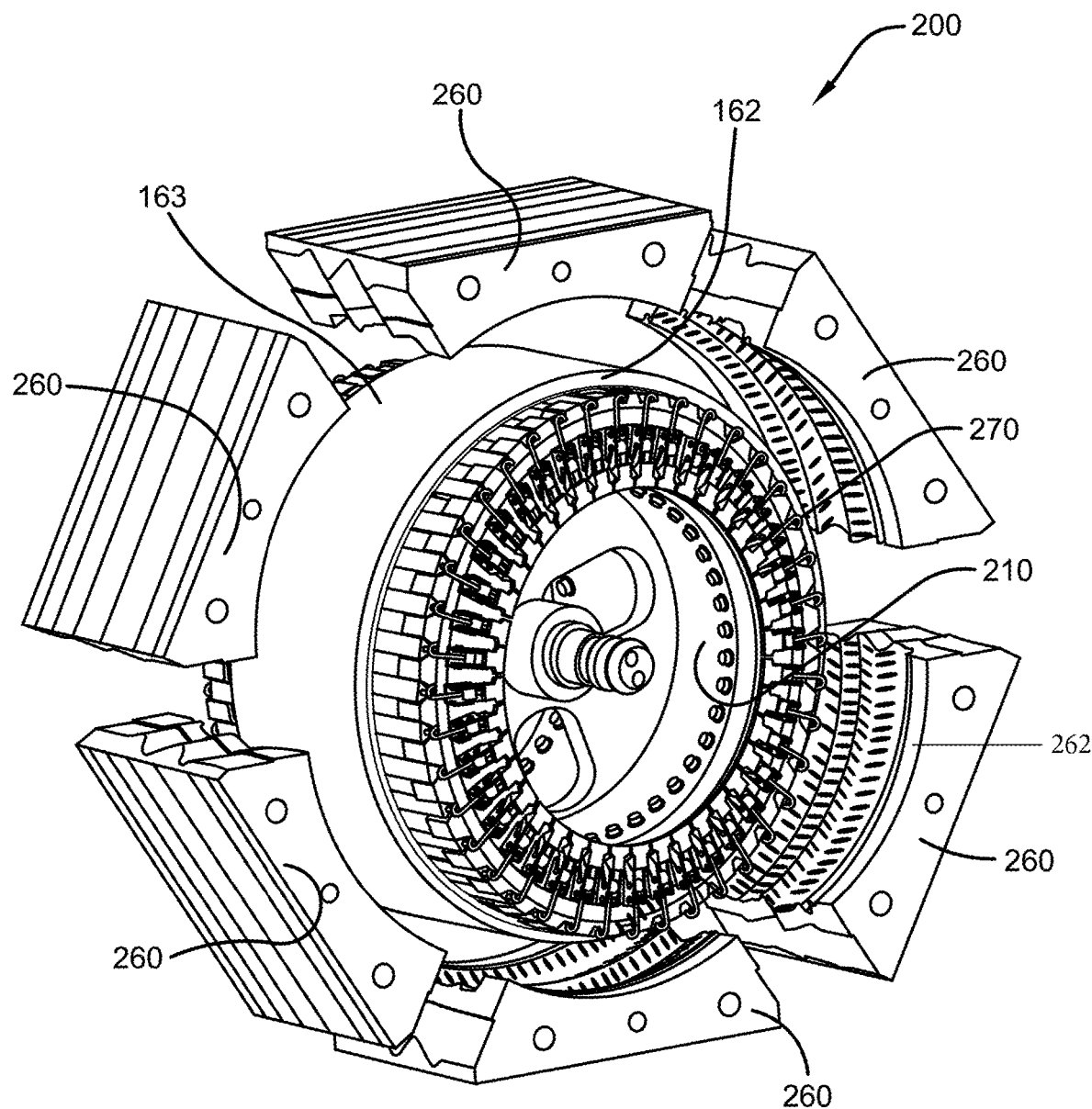
FIG. 18 is a schematic perspective view of yet another part of the assembly of FIG. 3.
Figure 19:
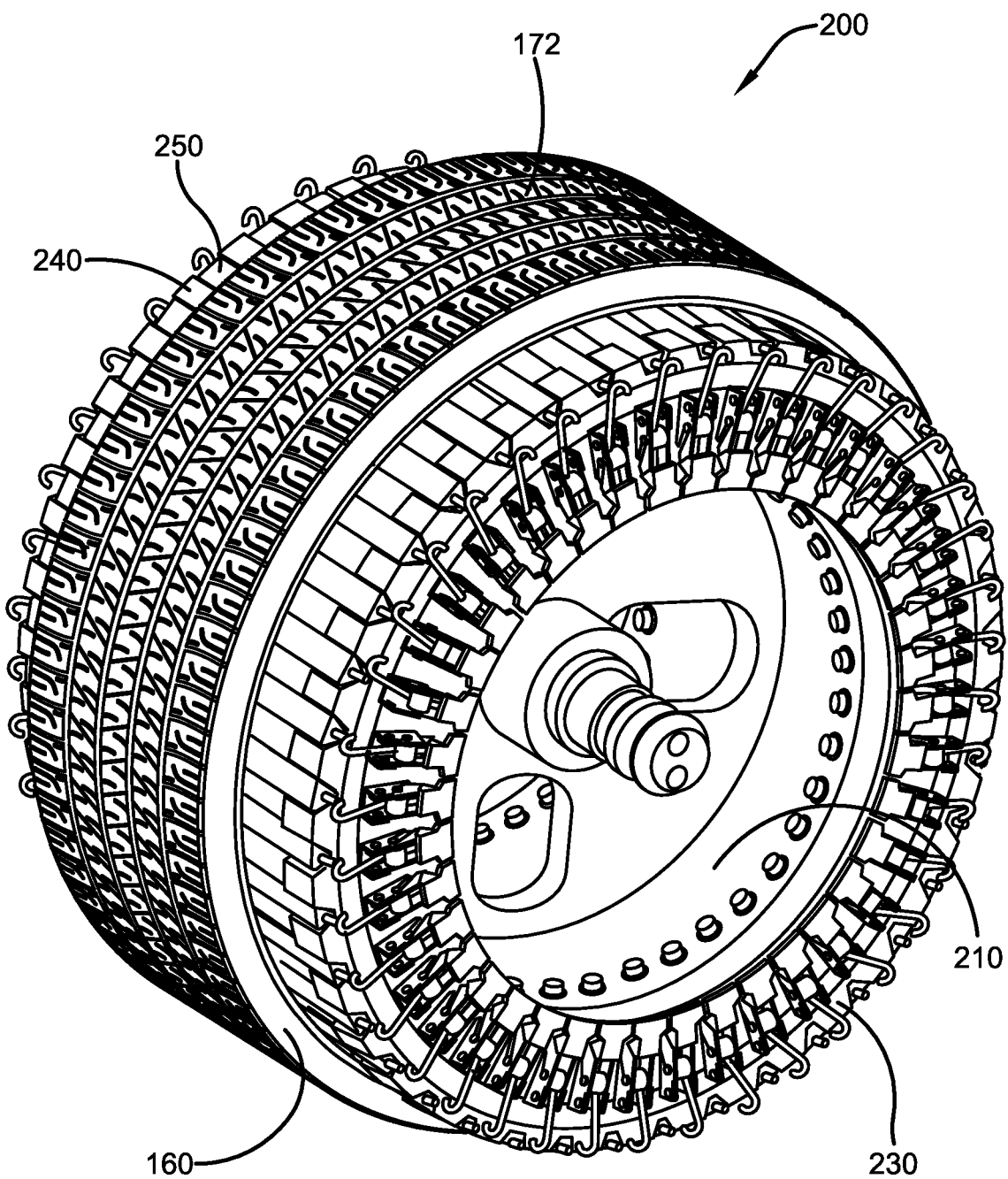
FIG. 19 is a schematic perspective view of still another part of the assembly of FIG. 3.
Figure 20:
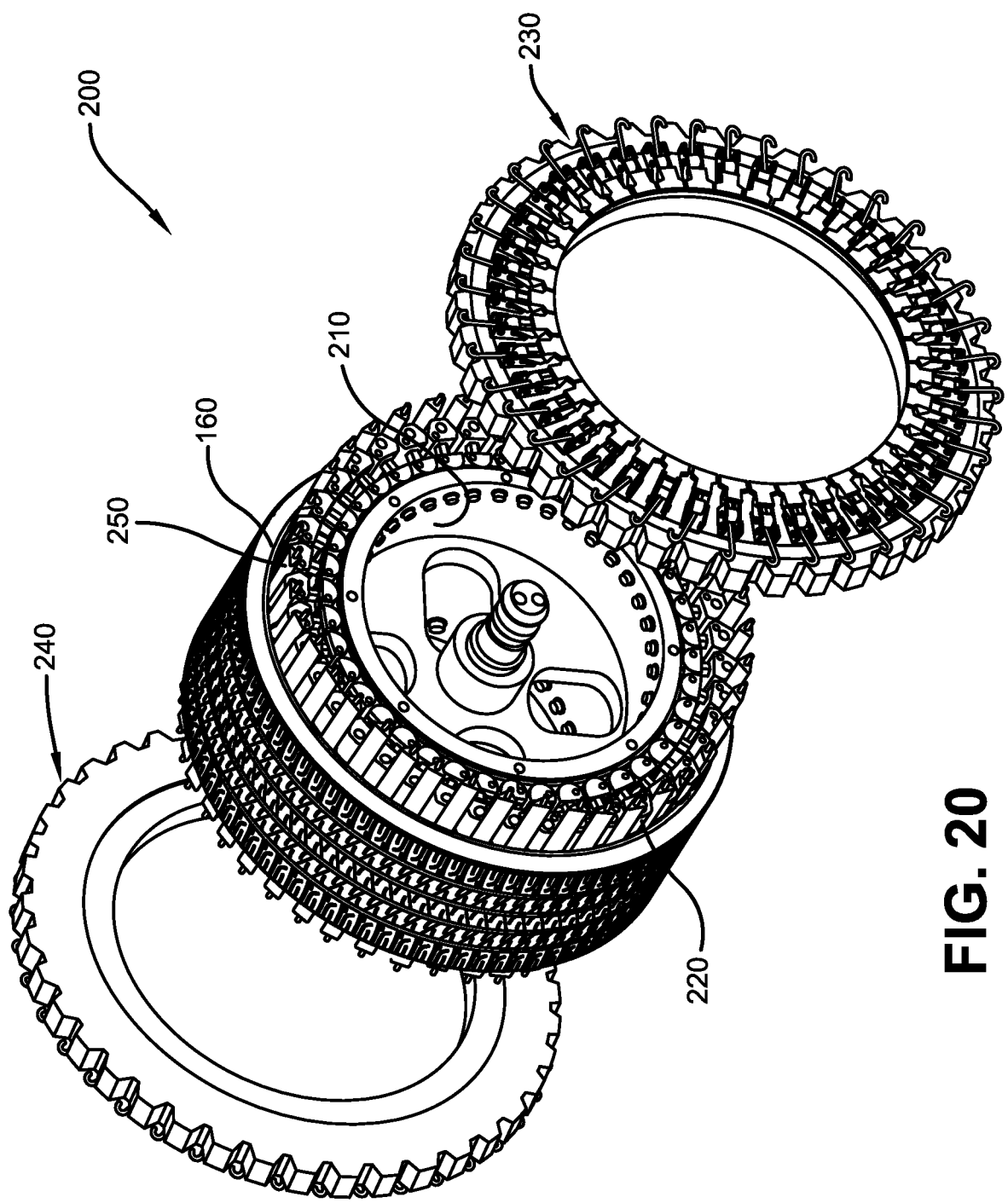
FIG. 20 is an exploded schematic perspective view of yet another part of the assembly of FIG. 3.
Figure 21:
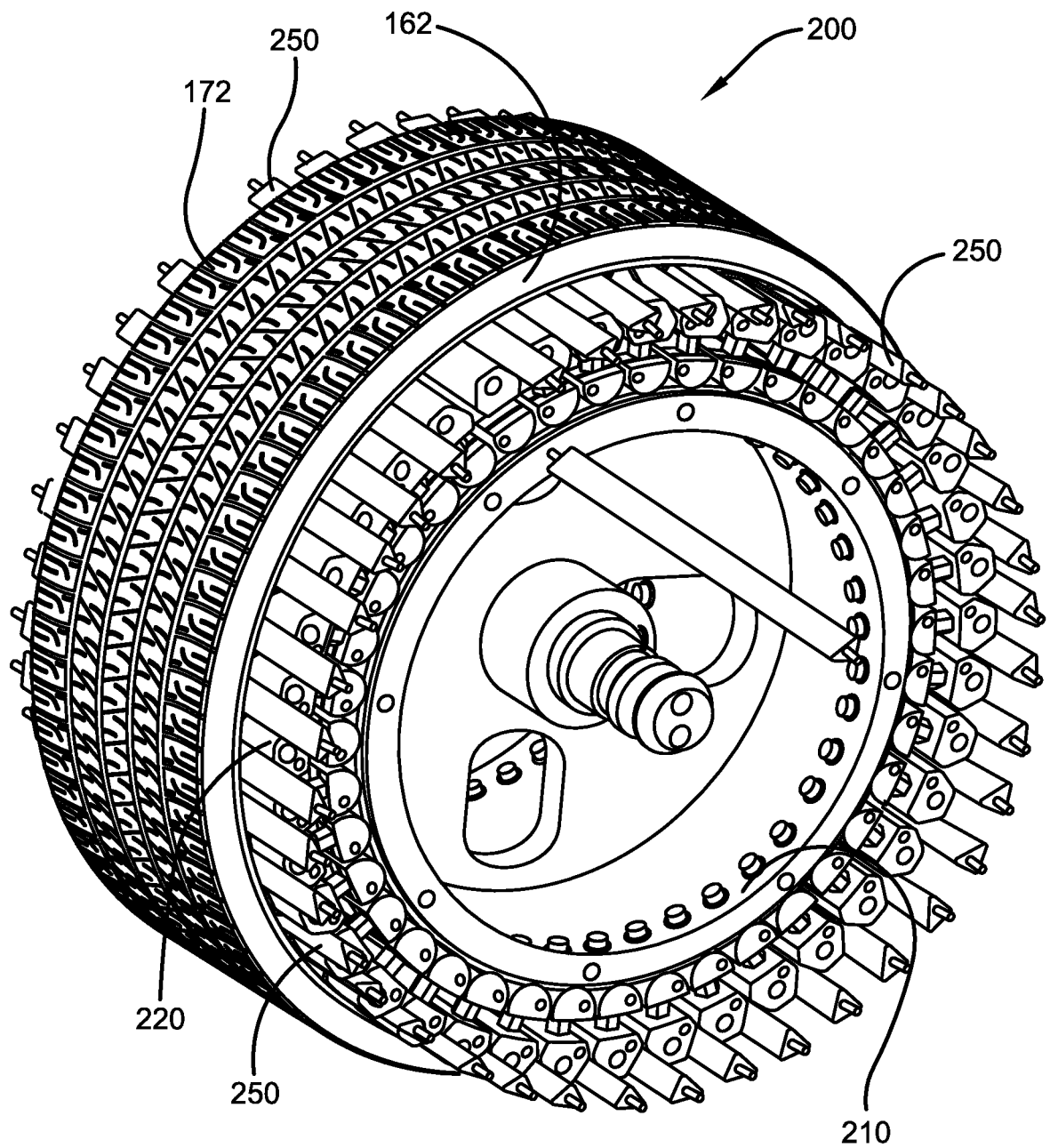
FIG. 21 is a schematic perspective view of still another part of the assembly of FIG. 3.

An inner annular shear band 160 and an outer annular tread member 162 of the tire assembly 140 may be serially placed circumferentially around the uniform outer cylindrical surface of flap members 147 and radially outer surface 252 and affixed to at least temporarily thereto and to each other 160, 162. This may be accomplished by building up layers 160, 162 around the assembly 200 similar to a conventional tire building method (not shown) or by forming a complete annular band structure from the shear band 160 and the tread member 162 (FIG. 17). A plurality of mold members 260 (six shown in FIG. 18) may be placed circumferentially around a radially outer surface 163 of the tread member 162. The mold members 260 may have radially inner surfaces 262 for together forming a tread shaped outer surface in the outer surface 163 of the tread member 162.

The spacer members 220, curing platens 230, 240, triangular inserts 250, and mold members 260 may be heated in order to cure form the flap members 147, shear band 160, and tread member 162 (e.g., uncured parts of the tire assembly 140) into a molded integral part of a complete, cured tire assembly 170 having an appropriate tread 172 (FIG. 23). Once curing is complete, the mold members 260 may be radially removed from around the complete tire assembly 170, the curing platens 230, 240 may be axially removed from the hub member 210, and the spacer members 220 and inserts 250 may be axially withdrawn from the tire assembly 170 to reveal stable cavities 176 within a spoke structure 174 of the mount-ready tire assembly 170.

A method, for use with the present invention, may cure and manufacture a partially-cured tire assembly 140 into a completed, "ready-to-install", completely cured tire assembly 170. The method may include: a first step of sliding an annular hub member 210 into a corresponding annular, radially inner surface 142 of the partially-cured tire assembly 140; a second step of maintaining a plurality of spacer members 220 within corresponding uniform cavity dimensions in the partially-cured tire assembly 140; a third step of fastening the spacer members 220 to the hub member 210 with flap members 147 of the partially-cured tire assembly 140 enclosing a radially outermost surface 222 of each of the spacer members 220; a fourth step of axially securing first and second curing platens 230, 240, the hub member 210, and spacer members 220 relative to each other; a fifth step of utilizing a plurality of triangular inserts 250 for creating a substantially smooth, uniform outer cylindrical surface formed by a radially outer surface 252 of each elongate insert 250 and each of the flap members 147 of the partially cured tire assembly 140 positioned by the radially outermost surfaces 222 of the spacer members 220; a sixth step of serially placing an uncured inner annular shear band 160 and an uncured outer annular tread member 162 of the partially-cured tire assembly 140 circumferentially around the uniform outer cylindrical surface 147, 252; a seventh step of affixing at least temporarily the uncured inner annular shear band 160 and the uncured outer annular tread member 162 of the partially-cured tire assembly 140 to each other 160, 162; an eighth step of placing a plurality of mold members 260 circumferentially around a radially outer surface 163 of the tread member 162; and a ninth step of forming a tread shaped outer surface in the outer surface 163 of the tread member 162 by radially inner surfaces 262 of the mold members.

The method may further include a tenth step of heating (e.g., by a hot liquid, steam, electricity, etc.) the spacer members 220, curing platens 230, 240, triangular inserts 250, and mold members 260 in order to cure/form the flap members 147, shear band 160, and tread member 162 (e.g., uncured parts of the partially-cured tire assembly 140) into a molded integral part of a complete, cured tire assembly 170 having an appropriate tread 172; an eleventh step of radially removing the mold members 260 from around the complete, fully-cured tire assembly 170; a twelfth step of axially removing the curing platens 230, 240 from the hub member 210; and a thirteenth step of axially withdrawing the spacer members 220 and inserts 250 from the fully-cured tire assembly 170 to reveal stable cavities 176 within a spoke structure 174 of the rim-mountable, fully-cured tire assembly 170.

Figure 1:
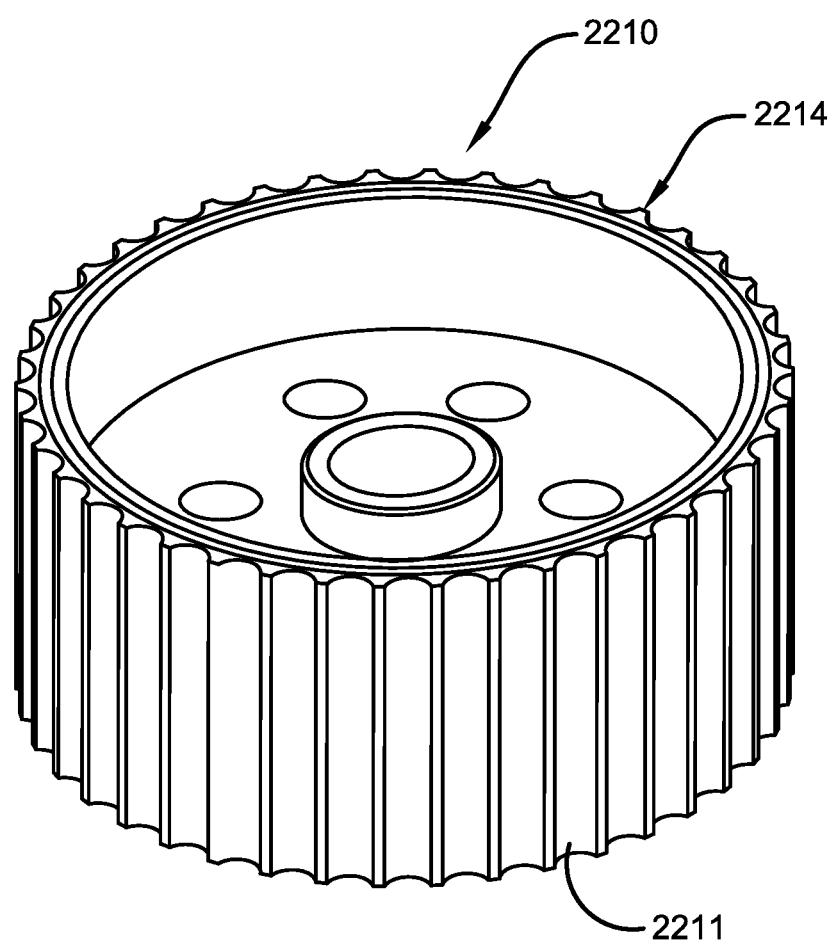
FIG. 1 is a schematic perspective representation of part of a system in accordance with the present invention.
Figure 2:
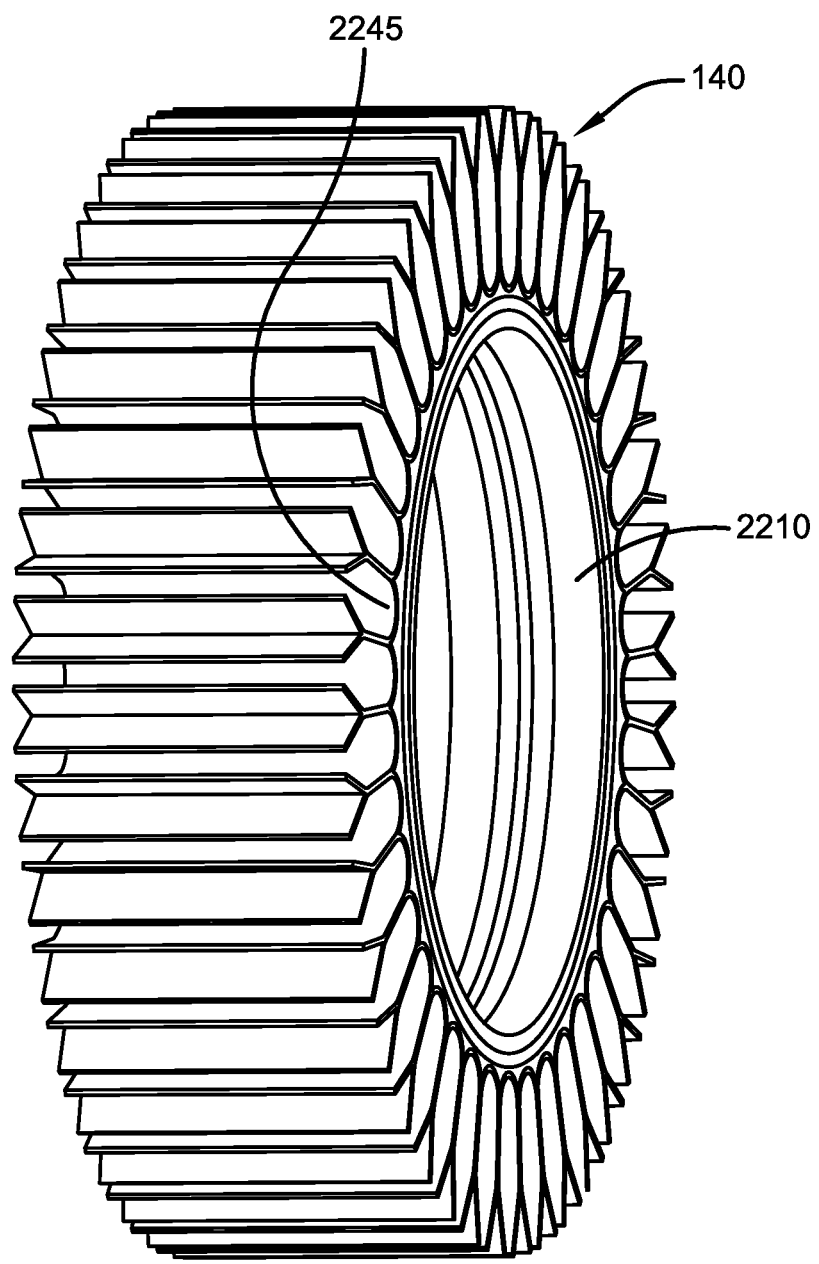
FIG. 2 is a schematic perspective representation of the part of FIG. 1 with another part of the system in accordance with the present invention.
Figure 3:
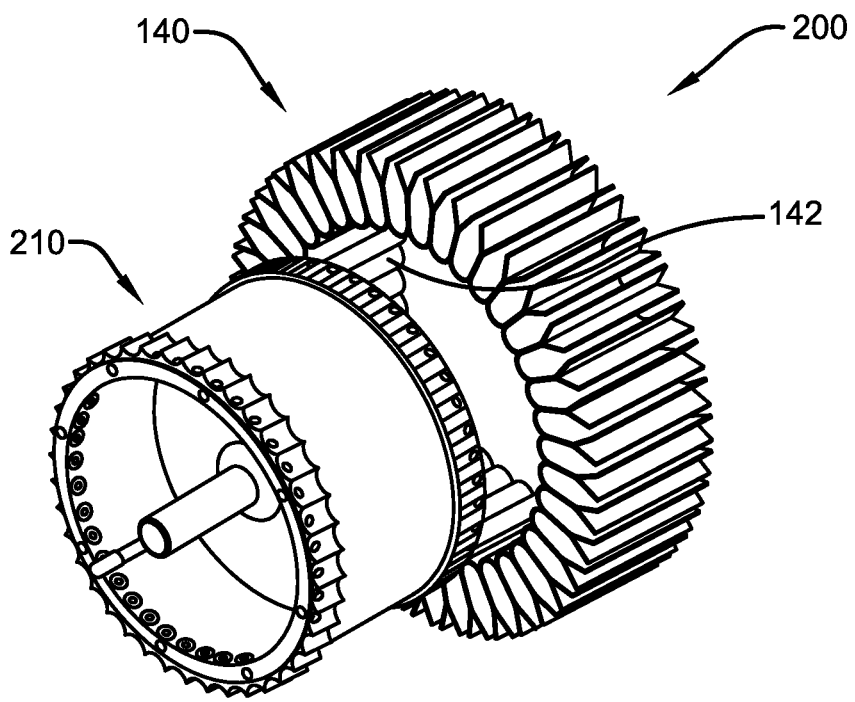
FIG. 3 is a schematic perspective view of a part of an example wheel/tire assembly for use with the present invention.
Figure 4:
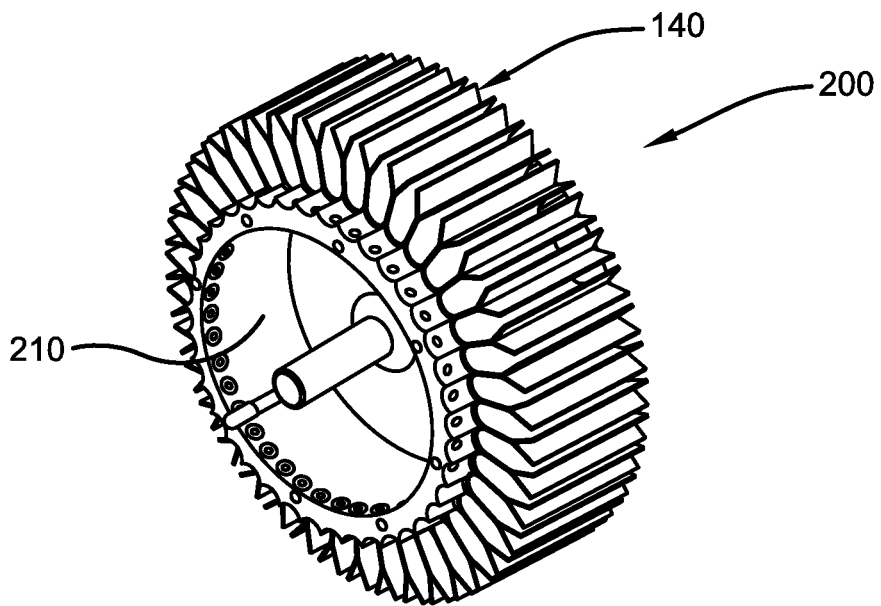
FIG. 4 is another schematic perspective view of part of the assembly of FIG. 3.
Figure 5:
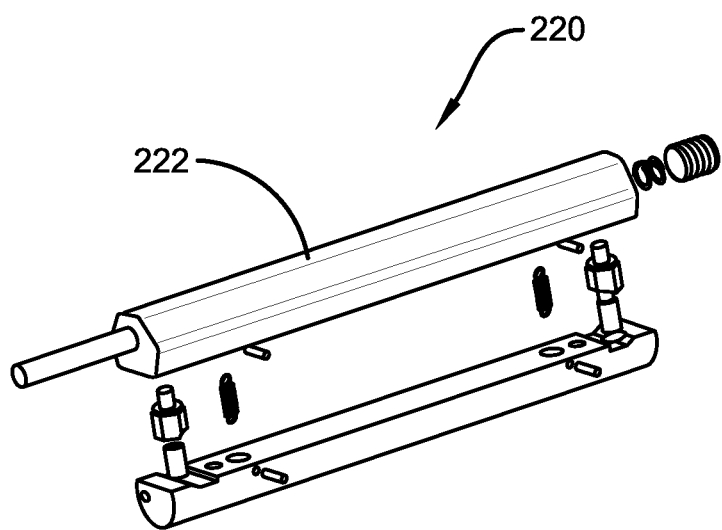
FIG. 5 is a schematic perspective view of another part of the assembly of FIG. 3.
Figure 6:
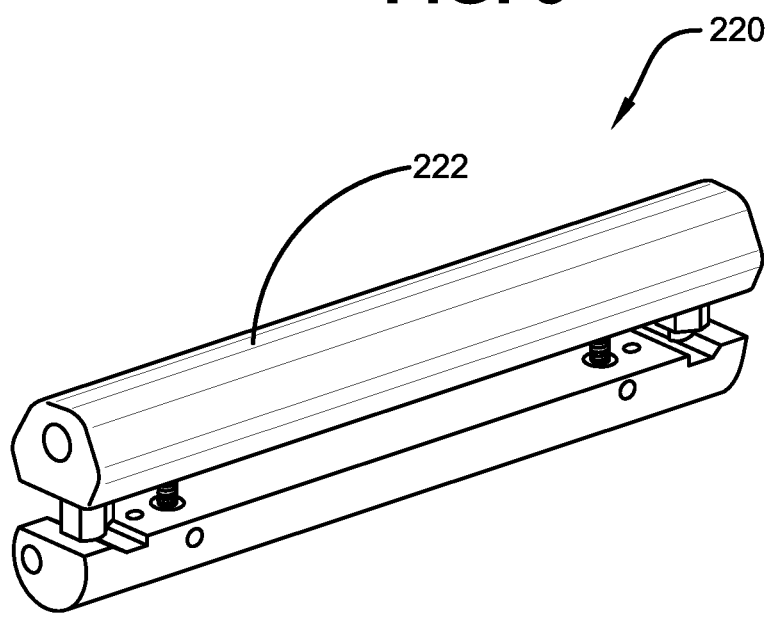
FIG. 6 is a schematic perspective view of yet another part of the assembly of FIG. 3.
Figure 7:
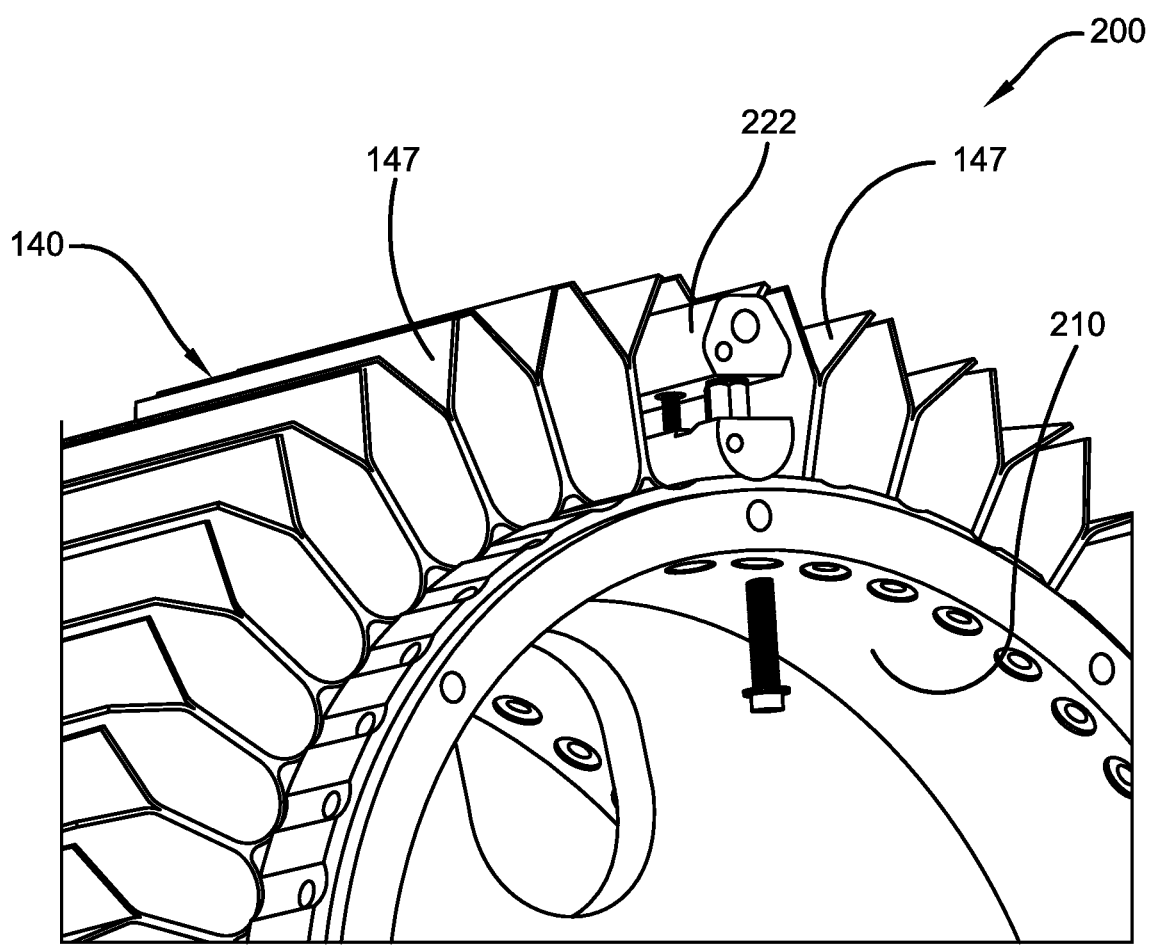
FIG. 7 is a schematic perspective view of still another part of the assembly of FIG. 3.
Figure 8:
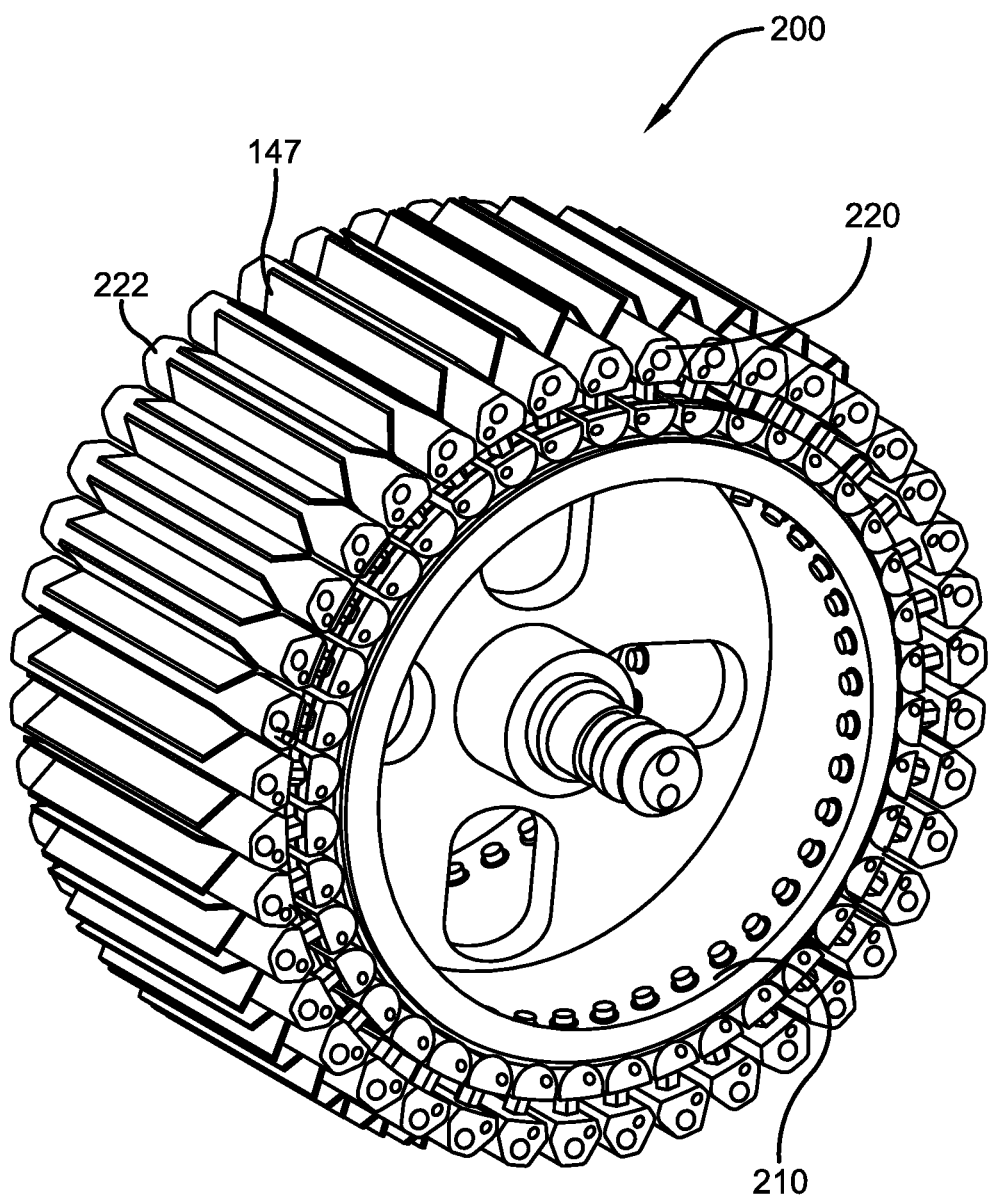
FIG. 8 is a schematic perspective view of yet another part of the assembly of FIG. 3.
Figure 9:
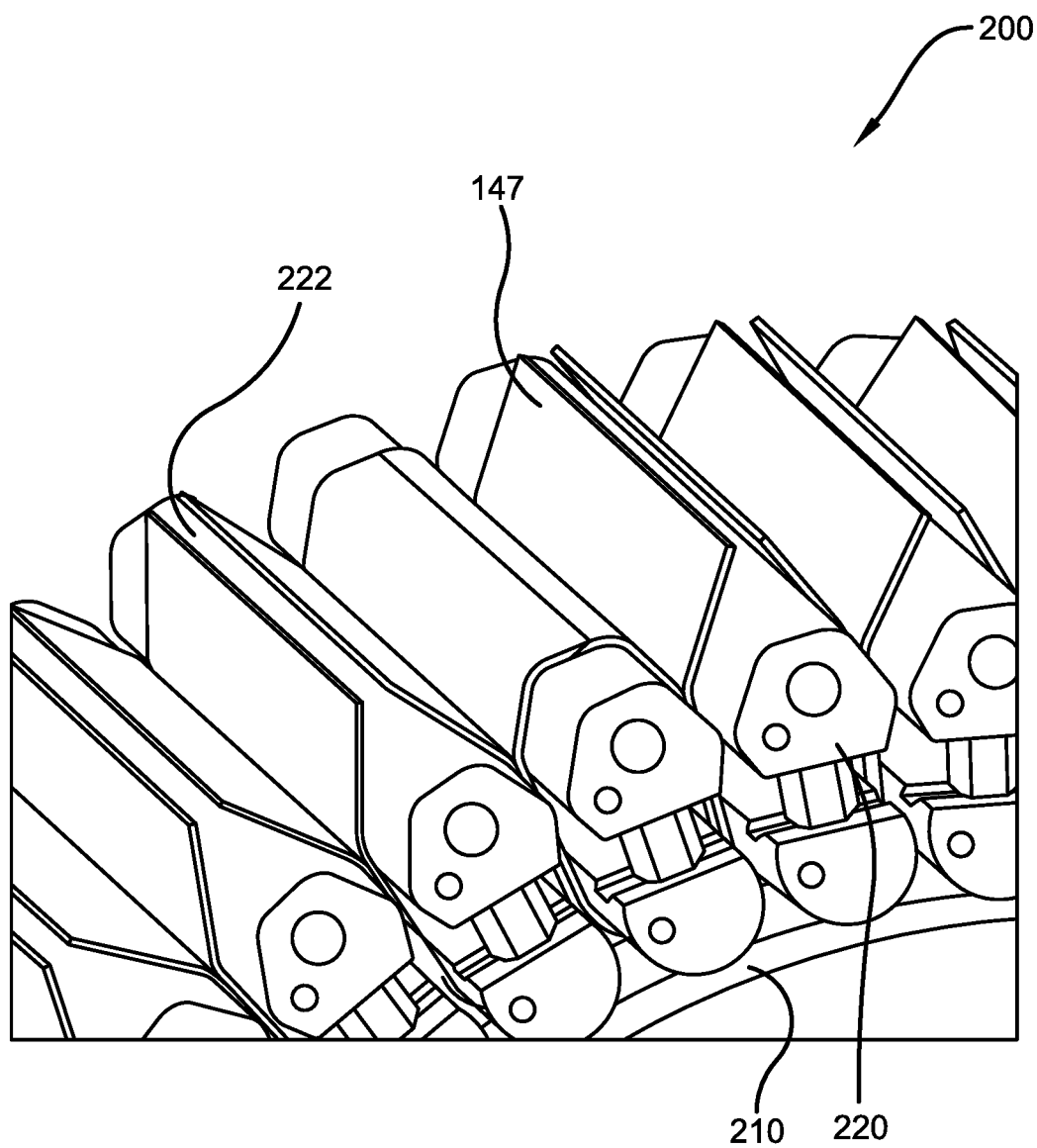
FIG. 9 is a schematic perspective view of still another part of the assembly of FIG. 3.
Figure 10:
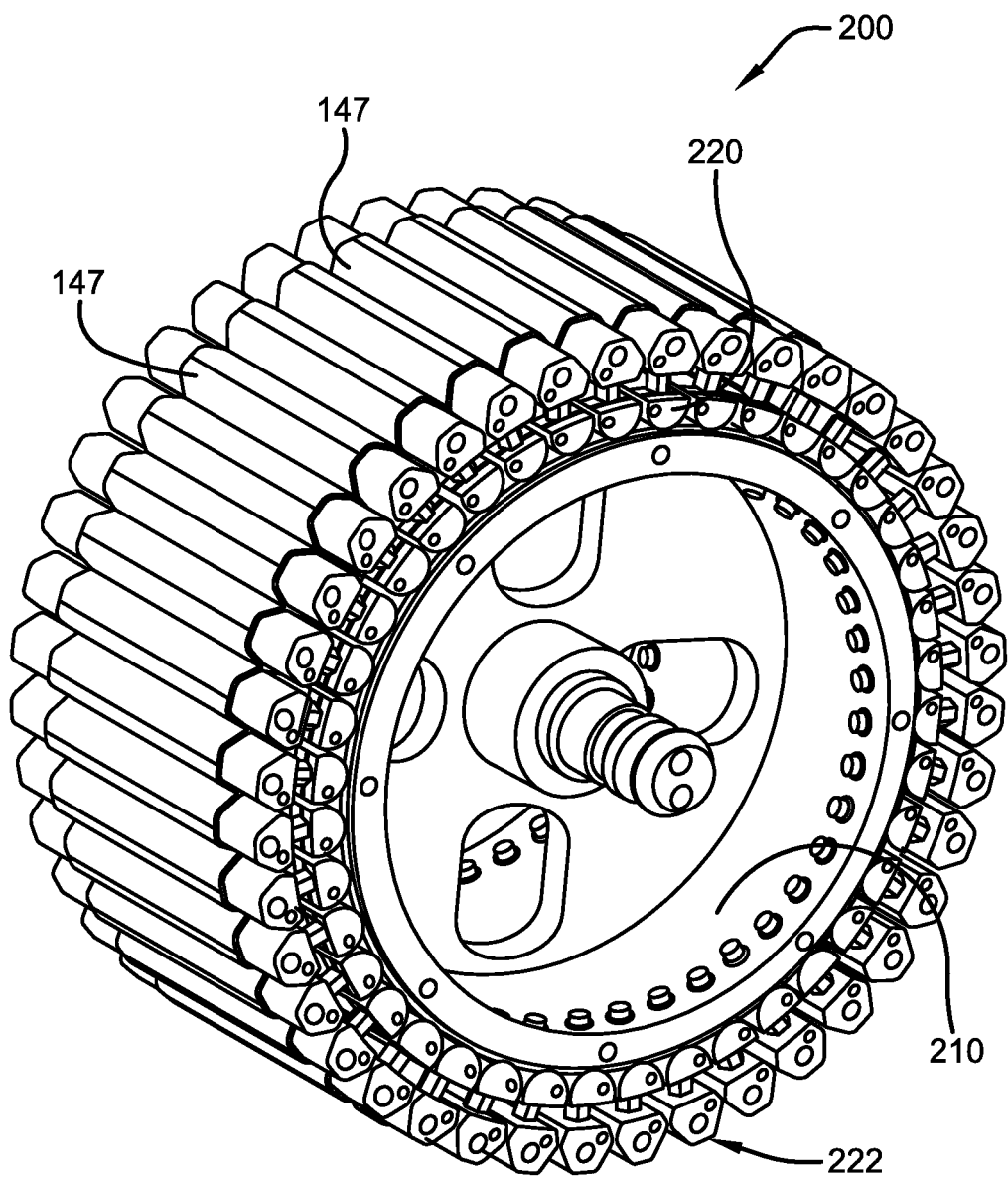
FIG. 10 is a schematic perspective view of yet another part of the assembly of FIG. 3.
Figure 11:
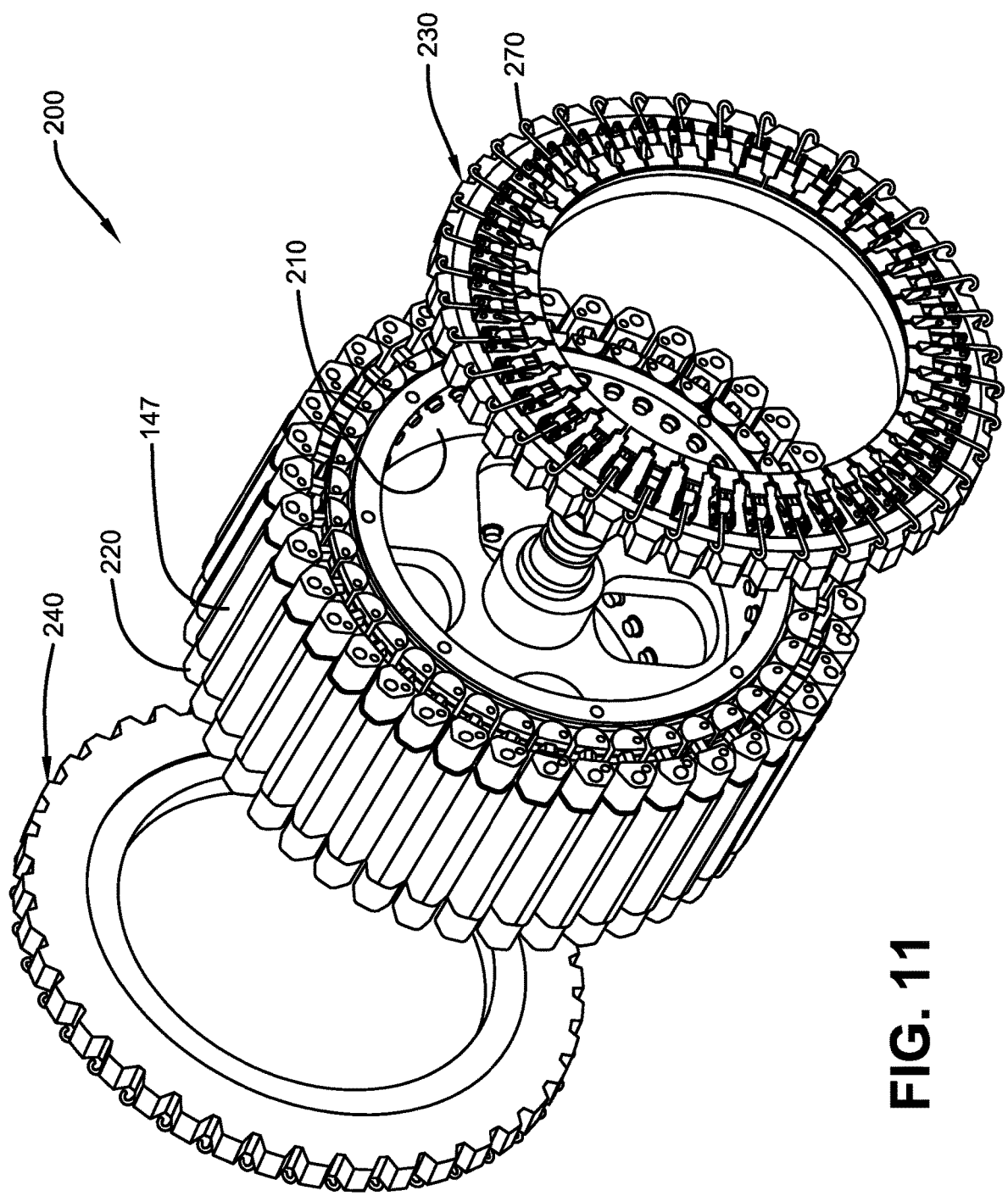
FIG. 11 is an exploded schematic perspective view of still another part of the assembly of FIG. 3.
Figure 12:
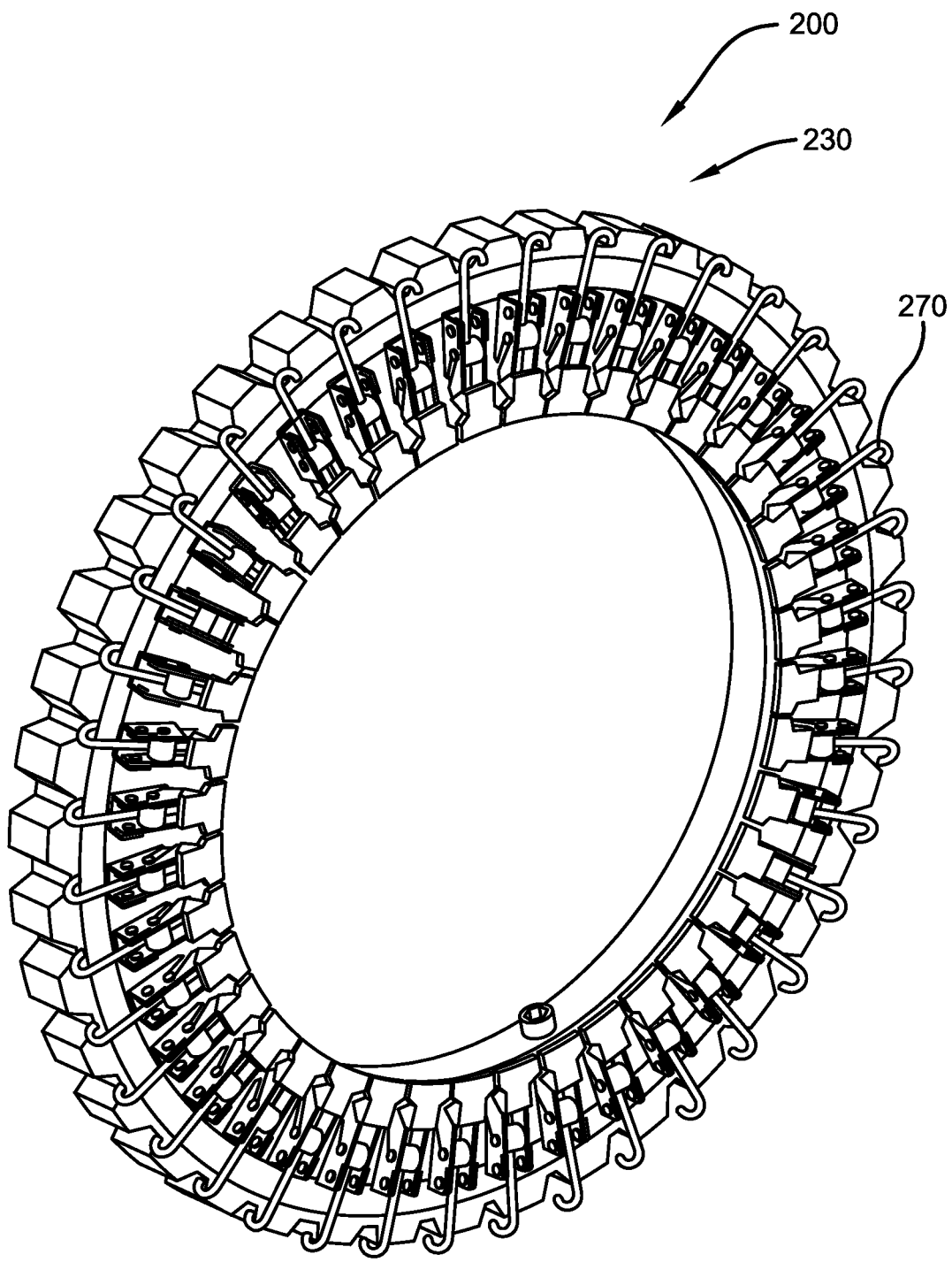
FIG. 12 is a schematic perspective view of yet another part of the assembly of FIG. 3.
Figure 13:
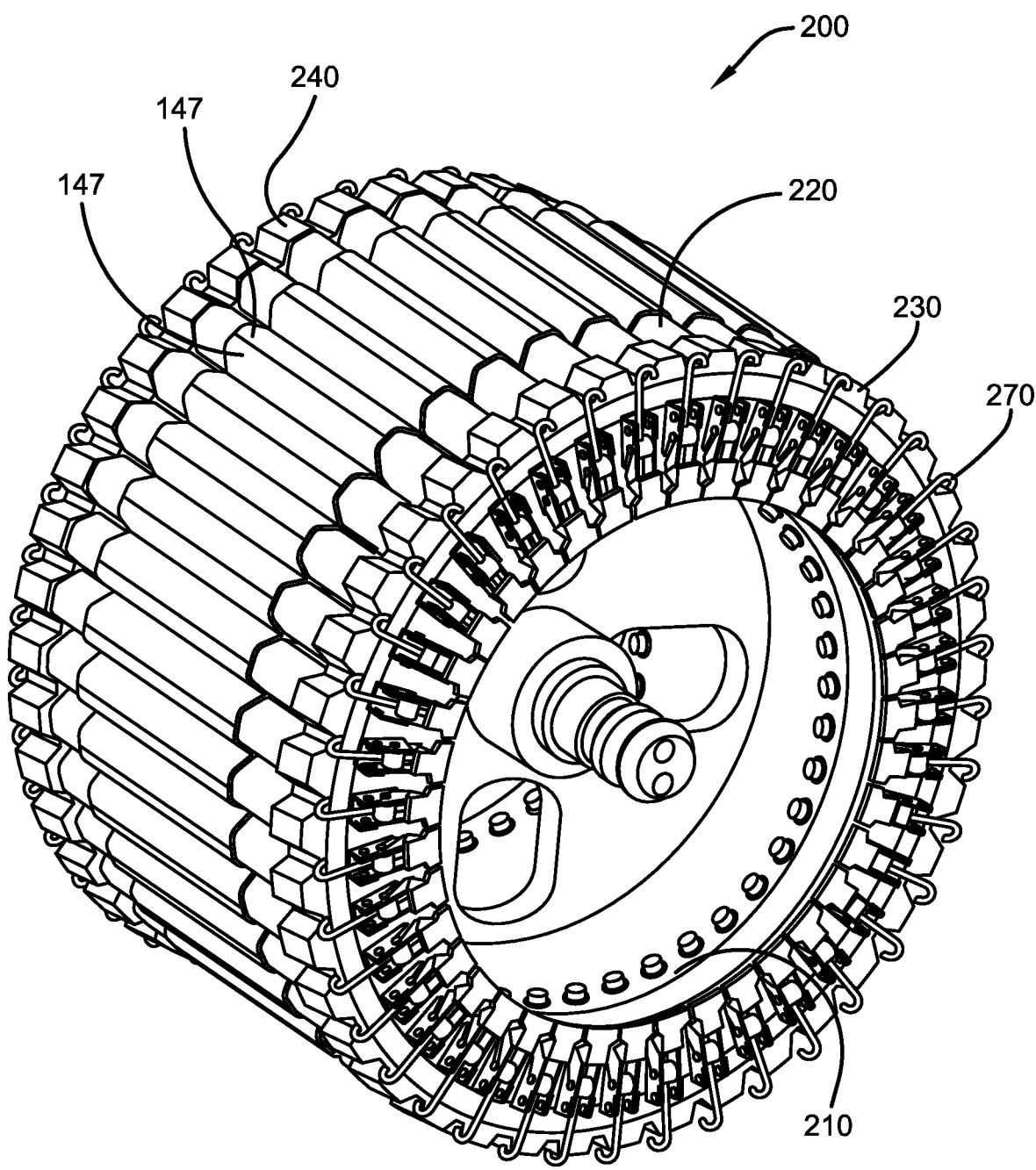
FIG. 13 is a schematic perspective view of still another part of the assembly of FIG. 3.
Figure 14:
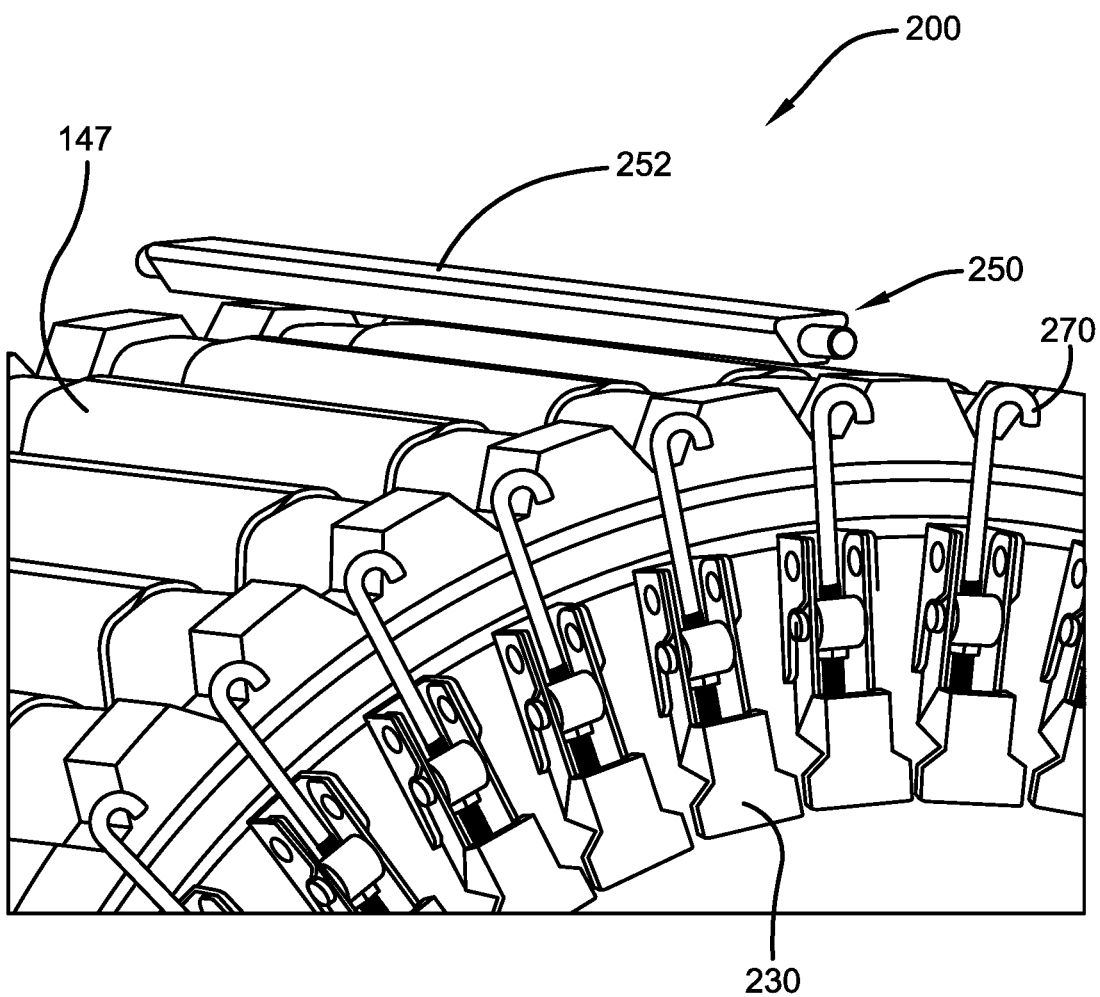
FIG. 14 is a schematic perspective view of yet another part of the assembly of FIG. 3.
Figure 15:
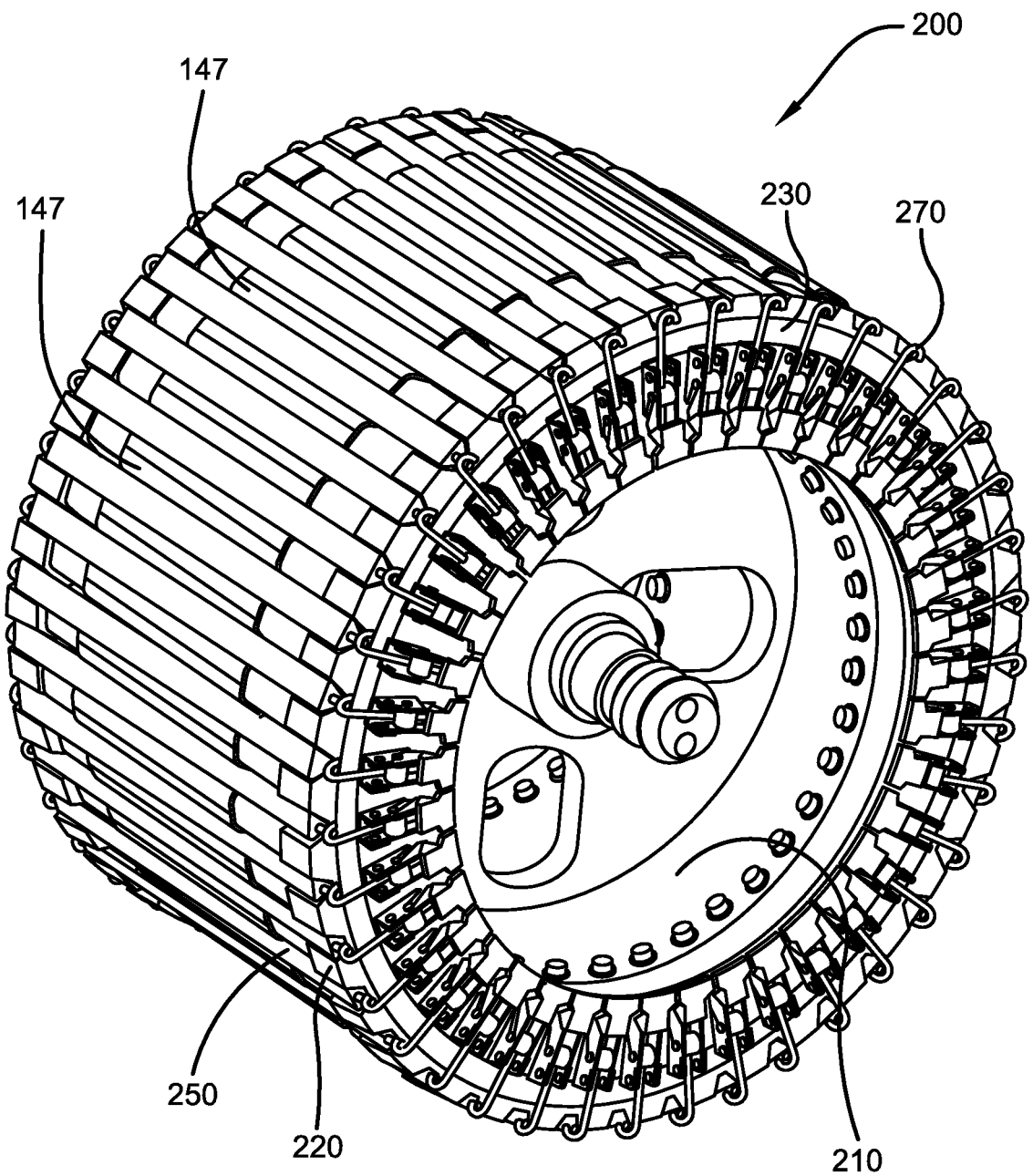
FIG. 15 is a schematic perspective view of still another part of the assembly of FIG. 3.
Figure 16:
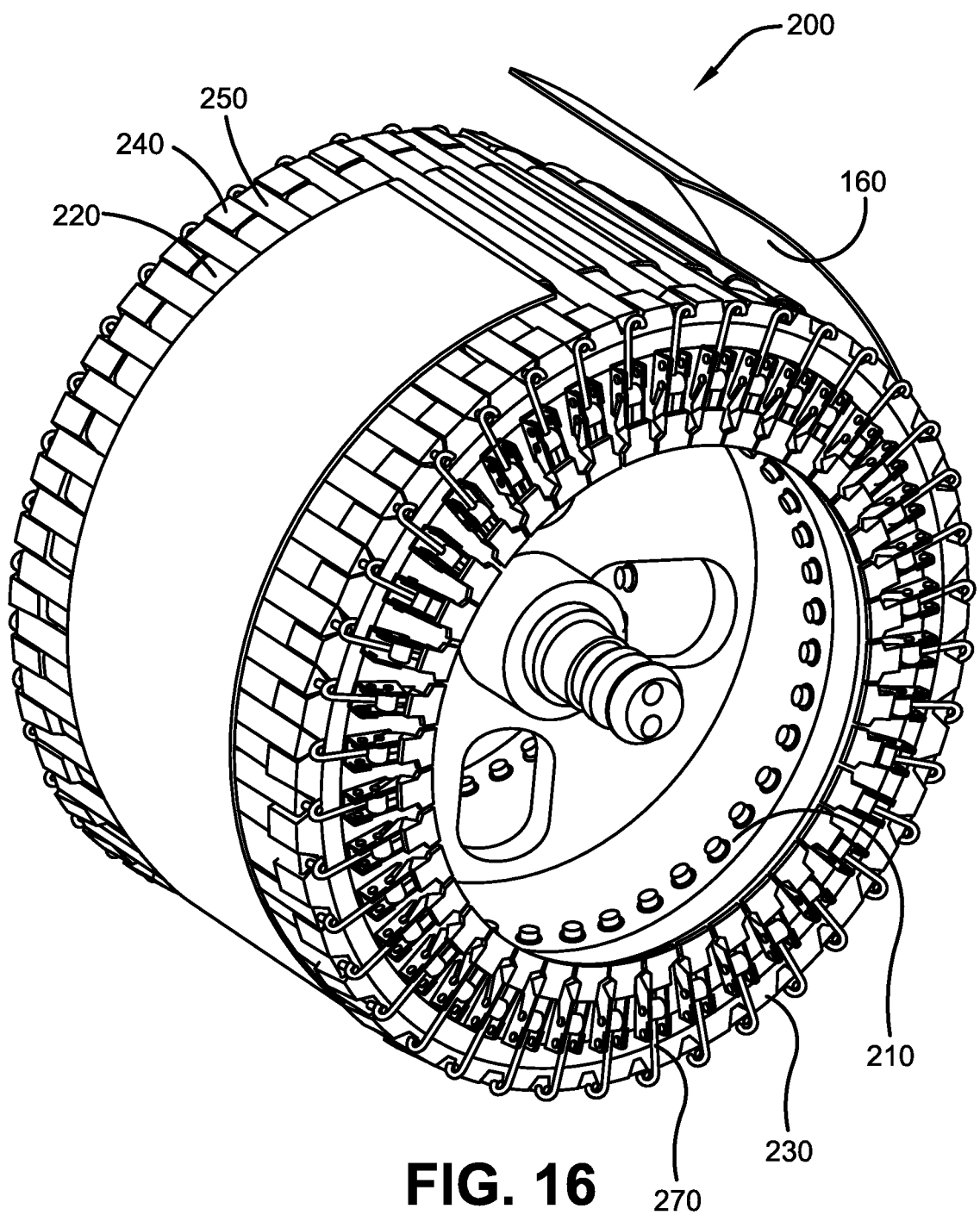
FIG. 16 is a schematic perspective view of yet another part of the assembly of FIG. 3.

In accordance with the present invention, the above first step of sliding an annular hub member 210 into a corresponding annular, radially inner surface 142 of the partially-cured tire assembly 140 may be replaced with a step of sliding an annular wheel member 2210 into a corresponding annular, radially inner surface 142 of the partially-cured tire assembly 140 (FIGS. 1-2). The wheel member 2210 may be a completely functional rim for attaching the fully completed tire 170 to a fully operational vehicle. The wheel member 2210 may have roughened up concave surfaces 2211 for increasing surface area and bond strength at the interface between the rubber tire 170 and wheel member. The concave surfaces may further define raised tips 2214 for more efficient torque and force transfer between corresponding convex surfaces 2245 of the tire assembly 140 and the wheel member. Thus, rubber/polymer components of the convex surfaces 2245 of the tire assembly 140 may be bonded to the concave surfaces 2211 of the wheel member 2210, similar to bonding between steel wire or bead wire and rubber/polymer components of a conventional pneumatic or ono-pneumatic tire.

The wheel member 2210 may thereby remain with tire assembly 140 throughout primary curing of the tire assembly 140 and the above secondary curing method such that a wheel member/tire assembly 2210, 170 may be rotatingly secured to a vehicle (FIG. 2). The use of the operational wheel assembly 2210 from the beginning of the overall method may reduce overall complexity and eliminate a later step of assembling the wheel member 2210 and tire assembly 170.

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A method for completing the curing of a partially cured tire assembly, the method comprising the steps of:
    sliding a functional wheel member into a corresponding annular, radially inner surface of the partially-cured tire assembly;
    maintaining a plurality of spacer members within corresponding uniform cavities in the partially-cured tire assembly;
    fastening each of the spacer members to the wheel member with uncured flap members of the partially-cured tire assembly enclosing a radially outermost surface of each of the spacer members;
    axially securing first and second curing platens, the wheel member, and spacer members relative to each other; and
    creating a substantially smooth, uniform outer cylindrical surface formed by a radially outer surface of each of a plurality of elongated inserts and each of the uncured flap members of the partially-cured tire assembly positioned by the radially outermost surfaces of the spacer members.

2. The method as set forth in claim 1 further including a step of serially placing an uncured inner annular shear band and an uncured outer annular tread member of the partially-cured tire assembly circumferentially around the uniform outer cylindrical surface.

3. The method as set forth in claim 2 further including a step of affixing the uncured inner annular shear band and the uncured outer annular tread member of the partially-cured tire assembly to each other.

4. The method as set forth in claim 2 further including a step of placing a plurality of mold members circumferentially around a radially outer surface of the tread member.

5. The method as set forth in claim 4 further including a step of forming a tread shaped outer surface in the outer surface of the tread member by radially inner surfaces of the mold members.

6. The method as set forth in claim 5 further including a step of heating the spacer members, curing platens, elongate inserts, and mold members in order to form the flap members, shear band, and tread member into a fully-cured tire assembly.

7. The method as set forth in claim 6 further including a step of radially removing the mold members from around the fully-cured tire assembly.

8. The method as set forth in claim 7 further including a step of axially removing the curing platens from the wheel member.

9. The method as set forth in claim 8 further including a step of axially withdrawing the spacer members and inserts from the fully-cured tire assembly to reveal stable cavities within a spoke structure of the fully-cured tire assembly.

10. The method as set forth in claim 6 wherein the heating step includes a medium from the group consisting of a hot liquid, steam, and electricity.

* * * * *